United States Patent [19]

Uchimura

[11] Patent Number: 4,632,198
[45] Date of Patent: Dec. 30, 1986

[54] MULTI-RANGE LOAD CELL WEIGHING INSTRUMENT

[75] Inventor: Mitsuo Uchimura, Shizuoka, Japan

[73] Assignee: Tokyo Electric Co., Ltd., Tokyo, Japan

[21] Appl. No.: 786,481

[22] Filed: Oct. 11, 1985

[30] Foreign Application Priority Data

Oct. 17, 1984 [JP] Japan .................. 59-217580

[51] Int. Cl.⁴ .................. G01G 3/14; G01G 3/08; G01L 1/22
[52] U.S. Cl. .................. 177/211; 177/229; 73/862.65
[58] Field of Search .................. 177/211, 229; 73/862.65

[56] References Cited

U.S. PATENT DOCUMENTS

| 4,037,675 | 7/1977 | Storace et al. | 177/229 |
| 4,307,787 | 12/1981 | Raboud et al. | 177/211 X |
| 4,420,054 | 12/1983 | Caris | 177/229 X |

FOREIGN PATENT DOCUMENTS 2087085 5/1982 United Kingdom .......... 73/862.65

Primary Examiner—George H. Miller, Jr.
Attorney, Agent, or Firm—Oblon, Fisher, Spivak, McClelland, & Maier

[57] ABSTRACT

An improvement in a multi-range load cell weighing instrument of the type which has a plurality of load cells including a high weighing load cell positioned adjacent a base and a low weighing load cell positioned adjacent a tray. In the improved weighing instrument according to the invention, the load cells are located such that the center lines along the length thereof substantially coincide with the center line of the tray. Accordingly, if a partial load condition is entered wherein a load is put aside relative to the tray, a force acting to twist the load cells is weakened, resulting in reduction of the frequency of causing flickering of indication. The weighing instrument further comprises a center stopper located on a tray frame for contacting with the load cells within a range of a predetermined fixed distance in a direction perpendicular to the length of the load cells in order to prevent swinging motions of the tray in a direction for which the load cells are relatively weak to further prevent flickering of indication and also to effectively prevent an overload from being applied to the low weighing load cell.

5 Claims, 10 Drawing Figures

MULTI-RANGE LOAD CELL WEIGHING INSTRUMENT

FIELD OF THE INVENTION AND RELATED PRIOR ART STATEMENT

This invention relates to a load cell weighing instrument, and more particularly to a multi-range load cell weighing instrument which can weigh a wide range of loads with high accuracy using a plurality of load cells having different weighing ranges.

Generally, a multi-range weighing instrument has different graduation ranges corresponding to weights to be weighed. For example, where a weighing range is 0 to 2.5 kg, then a graduation corresponds to 1 g, and where a weighing range is 2.5 to 10 kg, then a graduation corresponds to 5 g, and further where a weighing range is 10 to 35 kg, a graduation corresponds to 10 g. Conventionally, in such a multi-range weighing instrument, graduations are changed over with a single load cell, and hence an accuracy of 1/35000 is required.

In order to assure such an accuracy, care must be taken of a material of a load cell frame and selection of a strain gauge, and very high accuracy and so on is necessary for an AD converter. Therefore, it is difficult to realize such weighing instruments as can be produced in a mass from a point of view of the cost and reliability.

As means for allowing high accuracy in weighing in a wide range, multi-range weighing instruments which includes in combination a low weighing load cell and a high weighing load cell for weighing in different weighing ranges have been proposed in Japanese Patent Application No. 59-172297 and so on. In multi-range weighing instruments of this type, such problems as described above are eliminated, but if a partial load is applied to load cells, flickering readily appears. Such flickering is resulted from a characteristic that a load cell is strong to a partial load acting in a longitudinal direction thereof but is very weak to a partial load acting in a direction perpendicular to the longitudinal direction thereof so that it is twisted in the direction of the load.

An example of a multi-range weighing instrument which is constructed in consideration of prevention of flickering will be described with reference to FIGS. 1 to 3. A base 1 made of a plate material of a high strength is provided, and a plurality of legs 2 are mounted on the base 1 and placed on a floor. A high weighing load cell 3 is mounted on a widthwise center line on the base 1 with a securing portion 4 of the cell 3 secured to the base 1. While detailed description of the structure of the high weighing load cell 3 is omitted herein, the load cell 3 includes a load cell body 6 of a parallel shape having four thin wall deformed portions 5 and has strain gauges 7 adhered to the thin wall deformed portions 5 of the load cell body 6. An upper base 9 is secured to a load receiving portion 8 of the high weighing load cell 3, and a securing portion 11 of a low weighing load cell 10 is secured to the other end of the upper base 9. The low weighing load cell 10 has a similar structure to that of the high weighing load cell 3 and is located on a longitudinal extension line of the high weighing load cell 3. In other words, the high weighing load cell 3 and the low weighing load cell 10 are located on the widthwise center line of the base 1. A tray frame 13 is mounted on a load receiving portion 12 of the low weighing load cell 10 mounted in this way, and a tray 14 is placed on the tray frame 13. The center of the tray 14 coincides with the center of the base 1. From the low weighing load cell 10, a soft connecting line 15 such as, for example, a silicon coated wire, is drawn out and is curved into the form of a loop and connected to an electronic circuit section 16 located on the base 1. An output cable 17 consisting of a connecting line is drawn out also from the high weighing load cell 3 and is connected to the electronic circuit section 16. As shown in FIG. 3, the electronic circuit section 16 includes a pair of amplifiers 18 and 19 connected to the low and high weighing load cells 3 and 10, respectively, a pair of analog-to-digital converters 20 and 21, a pair of switches 22 and 23, and a CPU (central processing unit) 24. The CPU 24 is operable to selectively turn on the switches 22 and 23 and is connected to an external indicator 25 and an external interface 26.

In such a construction as described above, while a load of an article or the like is applied to the tray 14, it is unpredictable at which position the load point is positioned within an area of the tray 14, and when the load point is out of the center, a partial load is naturally applied to the load cells. However, since the high and low weighing load cells 3 and 10 are mutually adjusted in longitudinal positions thereof relative to the center line of the tray 14, the frequency of occurrence of a partial load is relatively low. Besides, occurrence of elastic vibrations of the low and high weighing load cells 10 and 3 resulting from a partial load is low, and hence occurrence of flickering resulting from such elastic vibrations is low.

Now, description will be given of an operation whether data is read in from the low weighing load cell 10 or from the high weighing load cell 3, with reference had a flow chart illustrated in FIG. 10. At first, an output of the low weighing load cell 10 is measured, and then it is checked if the output is equal to or higher than "0" or not. If it is lower than "0", this means that the zero point is out of position, and indication for this is done. If the output is otherwise equal to or higher than "0", then setting of the zero point is regarded as correct, and it is checked if the output is lower than 2.5 kg. If it is lower than 2.5 kg, the output is indicated and the data is processed since the output is within the weighing range of the low weighing load cell 10. Otherwise if the output of the low weighing load cell 10 is equal to or higher than 2.5 kg, the output of the high weighing load cell 3 is measured, and it is checked if the output is higher than 2.5 kg. If the output is lower than 2.5 kg, operation of the high weighing load cell 3 is wrong, and indication for this is performed. If the output is otherwise equal to or higher than 2.5 kg, the instrument is normal, and subsequently it is checked if the output is equal to or lower than the upper weighing limit 30 kg. If the output is higher than 30 kg, an overload is indicated since the weight is beyond the weighing range of the instrument. But otherwise if the output is equal to or lower than 30 kg, the value is indicated and the data is processed.

Since the output cable 17 is a connecting wire made of a soft material such as a silicon coated wire and is formed into a loop, a tensile force of the output cable 17 has no influence on the amount of deformation of the low weighing load cell 10.

Now, an example of a different type will be described with reference to FIGS. 4 to 6. In these figures, like reference numerals designate like parts or portions to those of the preceding example, and description thereof will be omitted herein. In the present example, a high weighing load cell 3 and a low weighing load cell 10 are disposed in a straight line. In particular, an upper base 9 is formed into a channel which is open at the top thereof, and a securing portion 11 of the low weighing load cell 10 is secured to an upper end of the upper base 9. A support plate 27 is secured to an upper edge of the upper base 9, and a load receiving portion 8 of the high weighing load cell 3 is connected to the support plate 27.

By disposing the high weighing load cell 3 and the low weighing load cell 10 on a straight line in this manner, the entire height of the arrangement can be reduced since they do not overlap vertically one on the other. Besides, since the high weighing load cell 3 and the low weighing load cell 10 have longitudinal positions thereof which coincide with the center line of the tray 14, there is no flickering caused upon weighing, similarly to the arrangement described above in connection with FIGS. 1 to 3.

By such constructions, occurrence of flickering when a partial load is applied can be prevented effectively, but there is no countermeasure for when an overload is applied. In other words, if an overload is applied, it will twist the low weighing load cell, causing a trouble.

OBJECT AND SUMMARY OF THE INVENTION

It is an object of the present invention to provide a multi-range load cell weighing instrument which can prevent flickering caused by a partial load and prevent application of an overload to a low weighing load cell therein.

According to the present invention, a plurality of load cells are disposed such that center lines thereof substantially coincide with the center line of of a tray, and a high weighing load cell is located on a base while a low weighing load cell is arranged such that a load applied thereto is received, when it is higher than a predetermined fixed level, by a center stopper which extends in a direction perpendicular to the longitudinal direction of the low weighing load cell, whereby application of an overload and a partial load to the low weighing load cell can be prevented.

DETAILED DESCRIPTION OF THE PREFERRED EMBODIMENT

Figure 7:
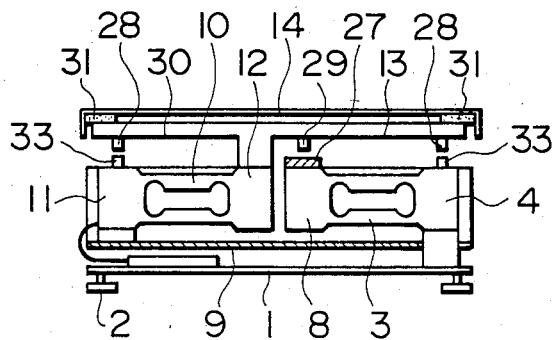
FIG. 7 is a vertical sectional, front elevational view illustrating an embodiment of the present invention.
Figure 8:
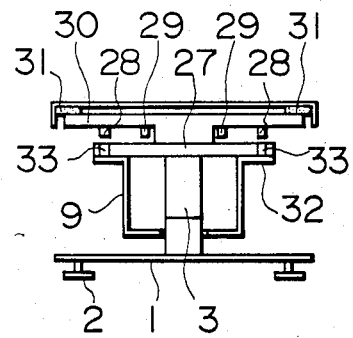
FIG. 8 is a vertical sectional, side elevational view of the arrangement of FIG. 7.
Figure 9:
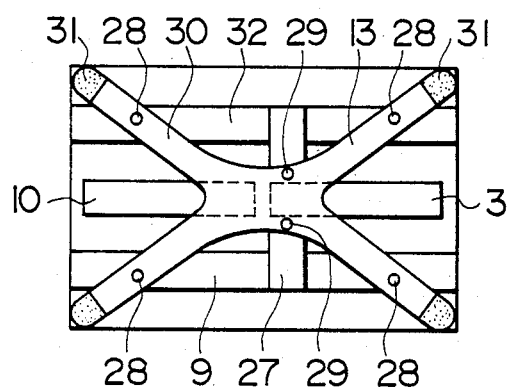
FIG. 9 is plan view of the arrangement of FIG. 7 with a tray removed.
Figure 10:
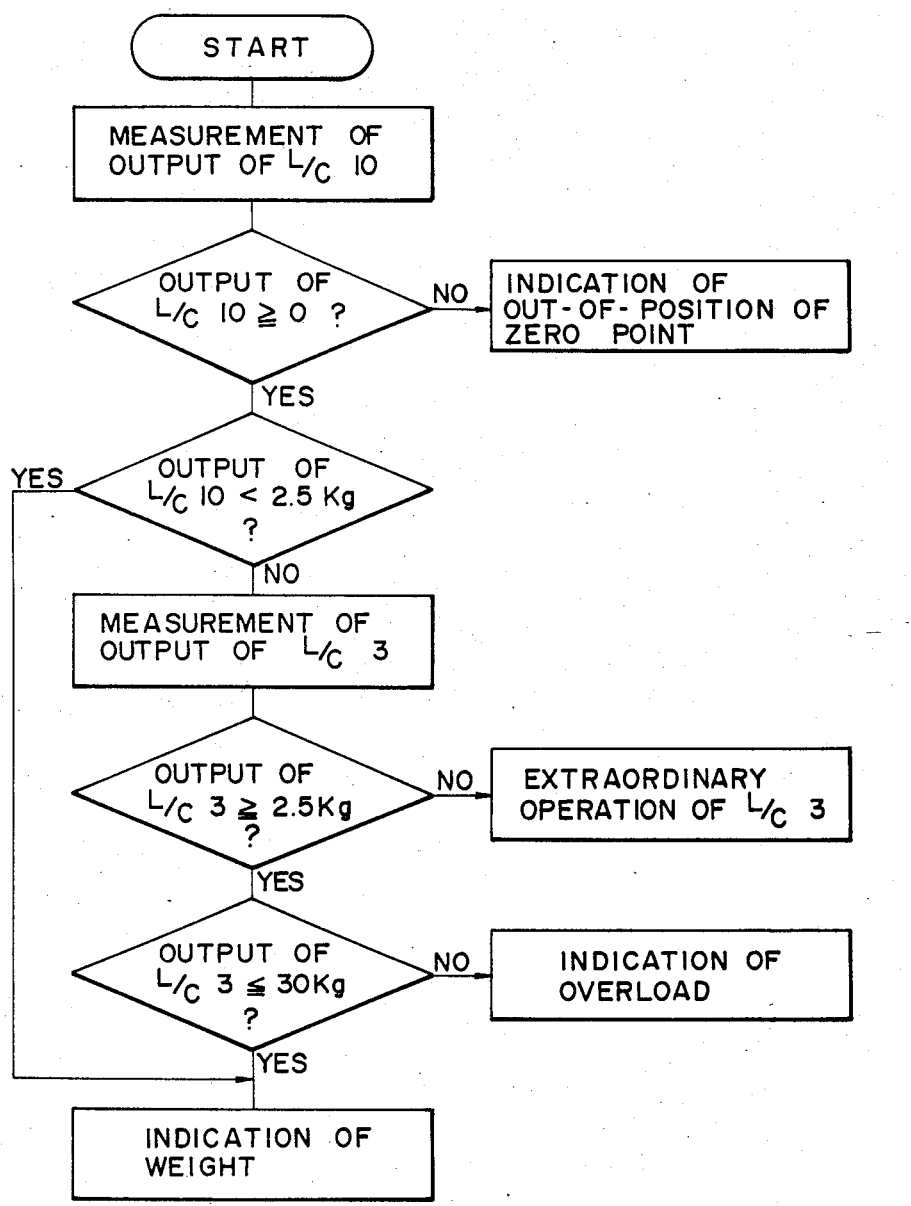
FIG. 10 is a flow chart illustrating an operation whether data is read in from a low weighing load cell or from a high weighing load cell.

An embodiment of the present invention will be described with reference to FIGS. 7 to 9. The embodiment basically has a similar construction to that of the arrangement shown in FIGS. 4 to 6 and additionally includes four corner stoppers 28 and two center stoppers 29. The tray frame 13 has four legs 30 extending radially to form an X-shape, and a damper member 31 made of a rubber material is mounted at an end of each of the legs 30 of the tray frame 13. The four corner stoppers 28 are secured to extend downwardly from intermediate portions of the legs 30 of the tray frame 13. Four receiving portions 33 are formed to extend from horizontally bent flat portions 32 of the upper base 9 and are located in an opposing relationship to and in a spaced relationship by a predetermined fixed distance from the four corner stoppers 28. The distance between the receiving portions 33 and the four corner stoppers 28 is set to be a little greater than a dimension of deformation of the low weighing load cell 10 upon weighing a rated maximum weight. Meanwhile, the two center stoppers 29 are located at central positions of the tray frame 13 in an opposing relationship to the support plate 27. The central stoppers 29 are spaced apart from each other such that they may contact with the high weighing load cell 3 or the low weighing load cell 10 within a range of a predetermined fixed distance in a direction perpendicular to the longitudinal directions of the high weighing load cell 3 and the low weighing load cell 10. However, there is no need of provision of such two center stoppers 29, and they may be replaced by one center stopper of a predetermined fixed length which is located for line contact with the support plate 27.

Figure 1:
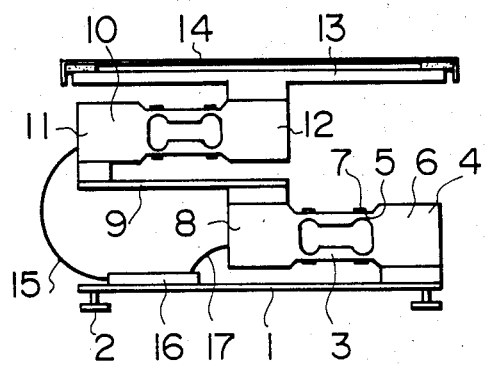
FIG. 1 is a vertical sectional view illustrating an example of arrangement of load cells by which flickering is prevented.
Figure 2:
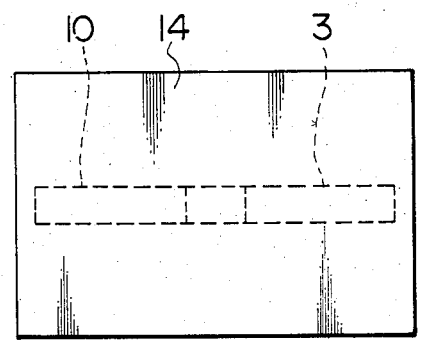
FIG. 2 is a plan view of the arrangement of FIG. 1.
Figure 3:
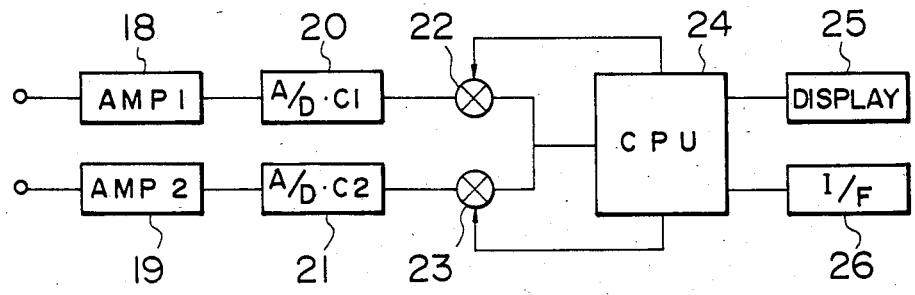
FIG. 3 is a block diagram of an electric circuit.
Figure 4:
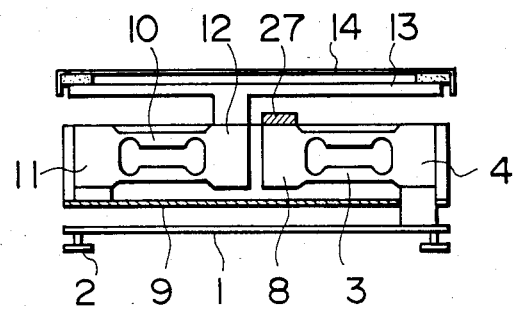
FIG. 4 is a vertical sectional view illustrating another example.
Figure 5:
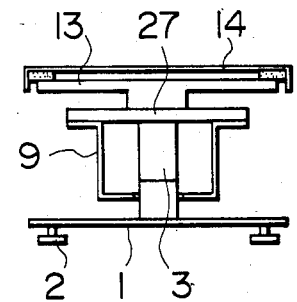
FIG. 5 is a vertical sectional, side elevational view of the arrangement of FIG. 4.
Figure 6:
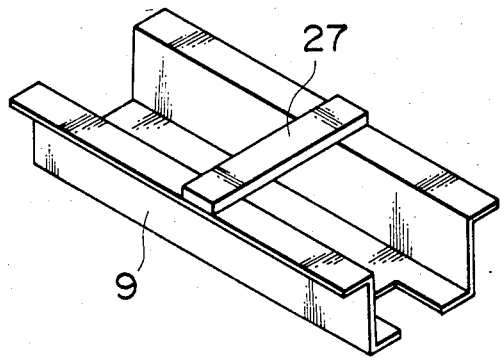
FIG. 6 is a perspective view of an upper base.

With such a construction as described above, if a partial load is applied to the tray 14, there is no flickering caused thereby upon weighing since the weighing instrument is constructed basically similarly to the arrangement shown in FIGS. 4 to 6. If a value of the load increases, the four corner stoppers 28 will contact with the opposing receiving portions 33, thereby protecting the low weighing load cell 10 from an overload and a partial load. The four corner stoppers 28 are provided on the premise that the tray frame 13 will be elastically deformed by an overload. Accordingly, if a load is placed at the center of the tray 14, the low weighing load cell 10 will be acted upon by a load higher than the maximum allowable load, but in such a case, the center stoppers 29 will act against it. Since the center stoppers 29 are located for engagement with the support plate 27 within a range of the predetermined distance, swinging motions of the tray frame 13 in the direction perpendicular to the longitudinal directions of the load cells are reduced, and hence flickering of indication is prevented. Meanwhile, as for a direction of the length of the load cells, there is no specific need of stopping motions of the load cells by means of a stopper or the like since indication is not influenced relatively by fluctuations of the load cells.

I claim:

1. In a multi-range load cell weighing instrument of the type which has two load cells including a high weighing load cell positioned adjacent a base and a low weighing load cell positioned adjacent a tray, the improvement wherein said load cells are located substantially at a same height and in an opposing relationship relative to each other such that the center lines along the length thereof substantially coincide with the center line of said tray, and wherein it comprises an upper base mounted in an opposing relationship to said tray on said low weighing load cell, the other end of said upper base being connected to said high weighing load cell, a tray frame directly connected to said low weighing load cell on which said tray is placed, and a center stopper located at a position of said tray frame opposed to and a short distance from said high weighing load cell so that said load cells are contacted when weight is received by said tray causing said center stopper to move said short distance.

2. A multi-range load cell weighing instrument according to claim 1, wherein said tray frame is formed in an X-shape.

3. A multi-range load cell weighing instrument according to claim 1, wherein said center stopper is located in an opposing relationship to a connecting portion of said upper base to said high weighing load cell.

4. In a multi-range load cell weighing instrument of the type which has two load cells including a high weighing load cell positioned adjacent a base and a low weighing load cell positioned adjacent a tray, the improvement wherein said load cells are located substantially at a same height and in an opposing relationship relative to each other such that the center lines along the length thereof substantially coincide with the center line of said tray, and wherein it comprises an upper base mounted in an opposing relationship to said tray on said low weighing load cell, the other end of said upper base being connected to said high weighing load cell, a tray frame directly connected to said low weighing load cell on which said tray is placed, four corner stoppers located at four corners of said tray frame and adapted to contact with said upper base when a load higher than a rated maximum level of said low weighing load cell is applied, and a center stopper located at a position of said tray frame opposed to and a short distance from said high weighing load cell so that said load cells are contacted when weight is received by said tray causing said center stopper to move said short distance.

5. A multi-range load cell weighing instrument according to claim 4, wherein said tray frame is formed in an X-shape, and said four corner stoppers are mounted at ends of four legs of said X-shaped tray frame.

* * * * *